Patented Nov. 3, 1942

2,301,118

UNITED STATES PATENT OFFICE 2,301,118

CONDENSATION PRODUCT OF NAPHTHOL, ALDEHYDE, AND DITHIO ACID AND METHOD OF PREPARING IT

Albert F. Hardman, Akron, Ohio, assignor to Wingfoot Corporation, Wilmington, Del., a corporation of Delaware No Drawing. Original application November 23, 1940, Serial No. 366,883. Divided and this application August 30, 1941, Serial No. 409,100

8 Claims. (Cl. 260—345)

This invention relates to new chemical compounds and the method of preparing them. The compounds may be used as accelerators of the vulcanization of rubber.

The compounds are formed by reacting (1) a naphthol, (2) an aldehyde and (3) a dithio acid, such as dithioacetic acid, dithiofuroic acid, a dithionaphthoic acid or dithiobenzoic acid or its homologs, including dithio phenyl benzoic acid. As the aldehyde, paraformaldehyde (water-free) is preferred. Formaldehyde may be used. The naphthol may be alpha or beta naphthol or a substituted derivative thereof.

Generally speaking a catalyst is required for the reaction. An alkaline or basic catalyst is used, and as it must be soluble in the reaction mass an organic compound will be preferred, such as hexamethylenetetramine, quinoline, piperidine, lutidine, quinaldine or dimethylaniline.

The invention will be further described in connection with the accompanying example.

EXAMPLE

The following compounds are mixed in the following proportions:

| | Parts by weight |
|---|---|
| 2-hydroxy-dithionaphthoic acid | 39.0 |
| Beta-naphthol | 30.0 |
| Paraformaldehyde | 6.5 |
| Toluene | 215.0 |
| Piperidine (as a catalyst) | Trace |

The ingredients are refluxed with a water trap until about 3.5 to 4.0 parts by weight of water has been collected. The reacted mix is then filtered and the solvent evaporated. In one instance this yielded 50 parts by weight of orange-red crystals which melted at 142–3° C.

Analysis: Sulfur found was 16.77 and 16.81%. Calculated to $C_{22}H_{16}O_2S_2$, the sulfur equals 17.0%. The formula, therefore, appears to be:

*Formula*

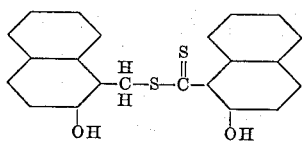

Other dithio acids, such as those above mentioned may be similarly reacted to produce a product having the general formula

where R is a naphthol nucleus, and $R_1$ may be aliphatic or aromatic.

This accelerator was used for the acceleration of rubber in the following formula:

| | Parts by weight |
|---|---|
| Rubber | 100.0 |
| Sulfur | 3.0 |
| Zinc oxide | 5.0 |
| Accelerator | .5 |
| Diphenylguanidine | .2 |

Instead of diphenylguanidine, ditolylguanidine or any basic type accelerator may be used. The curing data obtained with samples employing this formula were as follows:

| Cure in minutes, degrees F. | Tensile | Elongation | Modulus 500% |
|---|---|---|---|
| 20′ at 240° | 61 | 965 | 8 |
| 30′ at 240° | 135 | 845 | 18 |
| 40′ at 240° | 178 | 825 | 24 |
| 60′ at 240° | 230 | 800 | 33 |
| 80′ at 240° | 215 | 760 | 37 |

This application is a division of my application Serial No. 366,883 filed November 23, 1940.

What I claim is:

1. As a new product, $R.CH_2S.C(:S)R_1$ where R is a naphthol group and $-S.C(:S)R_1$ is a dithio acid group.

2. As a new product, $R.CH_2S.C(:S)R_1$ where R is a naphthol group and $-S.C(:S)R_1$ is a dithio naphthoic acid.

3. As a new product, $R.CH_2S.C(:S)R_1$ where R is a naphthol group and $-S.C(:S)R_1$ is dithio furoic acid.

4. As a new product, $R.CH_2S.C(:S)R_1$ where R is a naphthol group and $-S.C(:S)R_1$ is a dithio benzoic acid.

5. The process which comprises reacting, in the presence of a basic catalyst and at an elevated temperature, substantially equimolecular proportions of (1) a naphthol, (2) an aldehyde from the group consisting of formaldehyde and paraformaldehyde and (3) a dithio acid.

6. The process which comprises reacting, in the presence of a basic catalyst and at an elevated temperature, substantially equimolecular proportions of (1) a naphthol, (2) an aldehyde from the group consisting of formaldehyde and paraformaldehyde and (3) a dithio naphthoic acid.

7. The process which comprises reacting, in the presence of a basic catalyst and at an elevated temperature, substantially equimolecular proportions of (1) a naphthol, (2) an aldehyde from the group consisting of formaldehyde and paraformaldehyde and (3) dithio furoic acid.

8. The process which comprises reacting, in the presence of a basic catalyst and at an elevated temperature, substantially equimolecular proportions of (1) a naphthol, (2) an aldehyde from the group consisting of formaldehyde and paraformaldehyde and (3) a dithio benzoic acid.

ALBERT F. HARDMAN.